Figures 1, 2:
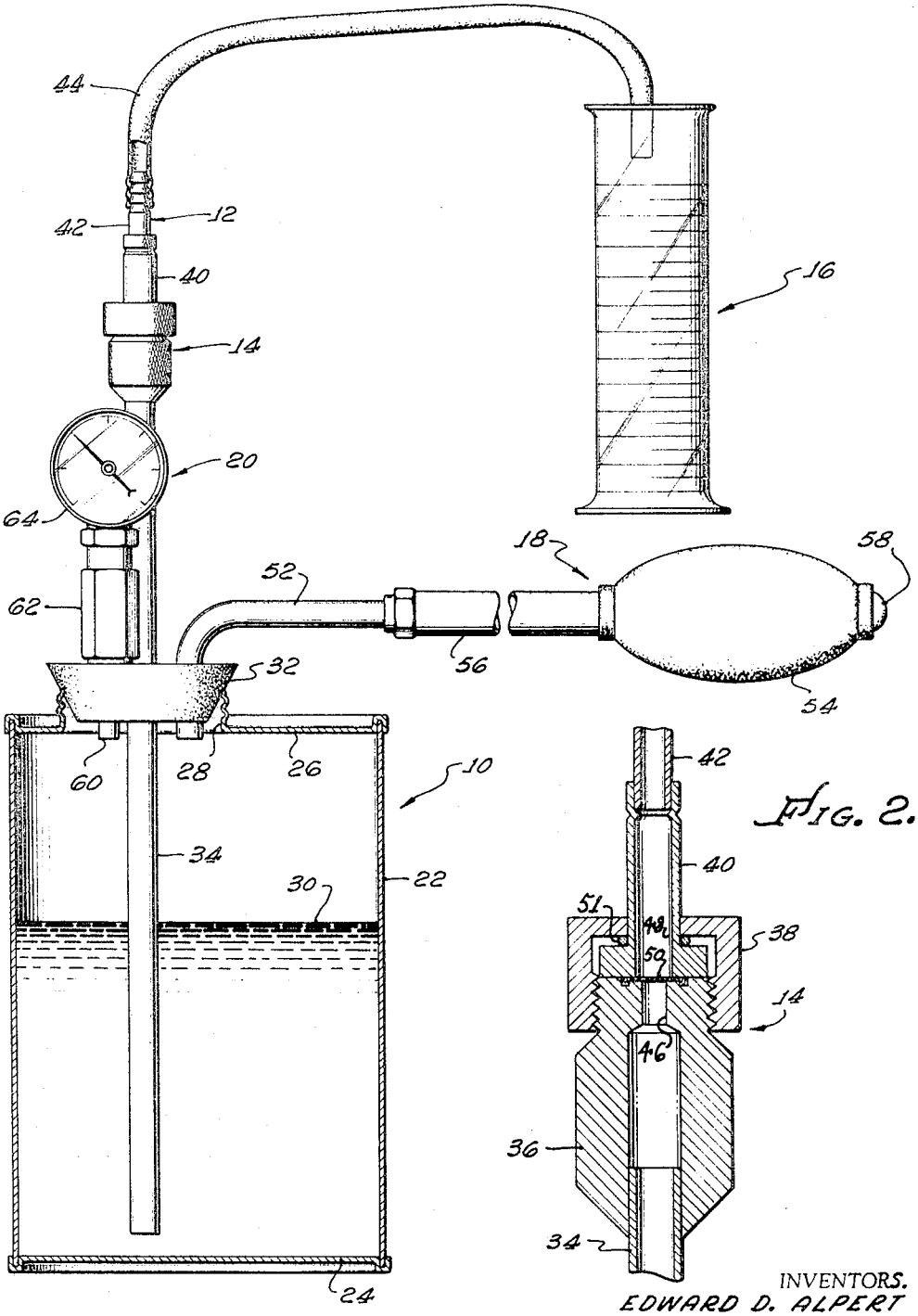

T 866,023

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 16, 1969

866 O.G. 703

818,031

METHOD AND APPARATUS FOR DETERMINING GASOLINE PLUGGING INDEX

Edward D. Alpert, Arcadia, Clifford M. Shaw, Long Beach, and John H. Humphreys, Jr., Buena Park, Calif., assignors to Atlantic Richfield Company, Philadelphia, Pa., a corporation of Pennsylvania

Filed Apr. 21, 1969. Published Sept. 16, 1969
Int. Cl. G01n *9/04, 11/02*
U.S. Cl. 73—61
1 Sheet Drawing. 10 Pages Specification

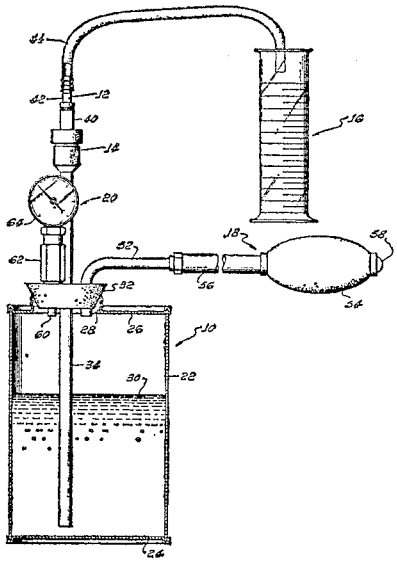

Particulate content of gasolines and the like are determined as the filter plugging index by forcing the gasoline through a standard filter disc for a predetermined time, measuring the amount of gasoline collected and comparing the amount collected with the amount of a standard clean hydrocarbon collected under like conditions. The test apparatus comprises a liquid container and collector with a conduit communicating therebetween, a standard filter disc, an orifice arrangement being provided in the conduit.

T 866,023

Sept. 16, 1969 E. D. ALPERT ET AL 818,031 DEF. PUB.

METHOD AND APPARATUS FOR DETERMINING GASOLINE PLUGGING INDEX

Filed April 21, 1969

INVENTORS.
EDWARD D. ALPERT
CLIFFORD M. SHAW
JOHN H. HUMPHREYS, JR.

BY Grant L. Hubbard
ATTORNEY